Figure 1:
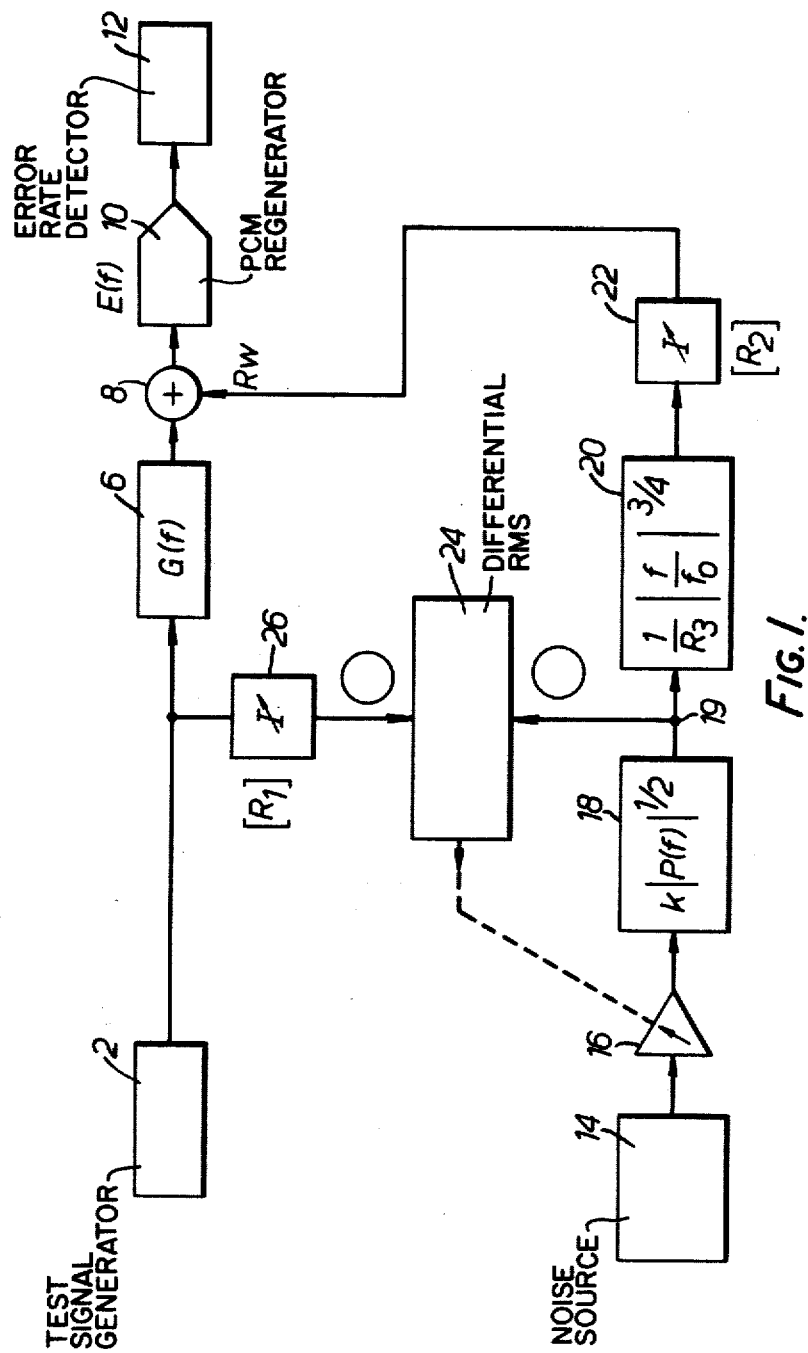

United States Patent [19]
Gibbs

[11] 4,300,233
[45] Nov. 10, 1981

[54] NOISE ASSESSMENT OF PCM REGENERATORS

[75] Inventor: Alan J. Gibbs, Cheltenham, Australia
[73] Assignee: Australian Telecommunications Commission, Melbourne, Australia
[21] Appl. No.: 93,228
[22] Filed: Nov. 13, 1979
[30] Foreign Application Priority Data Nov. 15, 1978 [AU] Australia .............................. PD6790

[51] Int. Cl.³ .......................... H04B 3/46; H04B 1/60
[52] U.S. Cl. .............................. 371/22; 179/175.31 R
[58] Field of Search .................................. 371/22, 28; 179/175.31 R; 375/10; 370/13

[56] References Cited

U.S. PATENT DOCUMENTS

| | | | |
|---|---|---|---|
| 3,678,222 | 7/1972 | Boehly | 371/22 X |
| 3,870,838 | 3/1975 | Corwin et al. | 179/175.31 R |
| 3,916,120 | 10/1975 | Morris | 179/175.31 R |
| 4,001,525 | 1/1977 | Edwards | 179/175.31 R |
| 4,112,263 | 9/1978 | Lender | 371/22 X |

OTHER PUBLICATIONS

Jacobsen, "Cable Crosstalk Limits on Low Capacity Pulse Code Modulation Systems", *Electrical Communication*, vol. 48, No. 1 & 2, 1973, pp. 98-107.

*Primary Examiner*—David H. Malzahn
*Attorney, Agent, or Firm*—Bacon & Thomas

[57] ABSTRACT

Instruments are disclosed for testing the susceptibility of PCM regenerators to rear end and far end crosstalk noise. The instruments of the invention are more compatible with PCM system engineering rules since certain important PCM system parameters are synthesized in the circuitry. The instrument for measuring susceptibility to rear end crosstalk includes a filter having a voltage transfer function $1/R_3|f/f_0|^{\frac{3}{4}}$ and the instrument for measuring susceptibility to far end crosstalk includes a filter having a voltage transfer function $1/R_3|f/f_0|$.

18 Claims, 8 Drawing Figures

NOISE ASSESSMENT OF PCM REGENERATORS

This invention relates to techniques for testing the noise performance of PCM regenerators.

In communications systems using cables consisting of a multiplicity of paired wires there is crosstalk between the pairs of wires. Near end crosstalk hereinafter referred to as NEXT arises due to the presence of signals transmitted on a pair of wires in a first direction in proximity to signals which are transmitted in the reverse direction on an adjacent wire pair. On the other hand, far end crosstalk hereinafter referred to as FEXT is the coupling between wire pairs carrying signals transmitted in the same direction. Both NEXT and FEXT arise because of impedance imbalance between the pairs of wires. The present invention is primarily concerned with the testing of PCM regenerators to determine what levels of NEXT and FEXT noise can be present in the signals applied to the regenerators before a specified error rate is exceeded. Clearly, the higher the level of noise which can be tolerated the better is the regenerator.

The conventional practice for assessment of the noise performance of regenerators is to simply determine the input signal to noise ratio which produces a specified error rate in the regenerator under test. Unfortunately, this performance measure is not directly related to the performance measures required for application of PCM system engineering rules. The object of the present invention is to provide a technique whereby an assessment of the regenerator can be made in terms which arise naturally in PCM system engineering rules and which, therefore, applies directly to these engineering rules.

NEXT NOISE FIGURE

The following description is intended to demonstrate the relationship of the NEXT noise figure which is defined below, to certain important inequalities which occur in PCM system engineering rules. Consider single cable operation with NEXT dominant, employing N systems (a system employs two pairs of wires for two way transmission) with regenerators having an output power spectral density $P(f)$, equalizer characteristic $E(f)$ operating over wire pairs with voltage transfer function $G(f)$. If $N_o$ is the mean-square NEXT interference at the regenerator decision point (i.e. at the output of the regenerator equalizer just prior to assignment of a 1, 0 or −1 in accordance with the signal level) producing a specified error rate which is typically $1 \times 10^{-7}$ then 99% of systems will have an error rate less than that specified provided the inequality set out below is satisfied. For further reference on this point see Steven D. Bradley "Crosstalk Considerations for a 48 Channel PCM Repeatered Line", IEEE Transactions on Communications Volume COM-23 No. 7 July 1975 and N. R. Narayana Murthy "Crosstalk Loss Requirements for PCM Transmission" IEEE Transactions on Communications Volume COM-24 No. 1 January 1976. The inequality is as follows:

$$\mu_{ON} \geq [N] + 0.115 \sigma_{ON}^2 + [T] + [I_N] - [N_o] \quad (1)$$
$$- \tfrac{1}{2}[1 + \tfrac{1}{N}(U \cdot 10^{0.023\sigma_{ON}^2} - 1)]$$
$$+ 4.86[1 + \tfrac{1}{N}(U \cdot 10^{0.023\sigma_{ON}^2} - 1)]^{\tfrac{1}{2}}$$

where $\mu_{ON}$ is the cable mean NEXT loss at half the system clock rate $f_o$, $\sigma_{ON}^2$ is the cable NEXT loss variance, T and U are appropriate truncation factors, $$I_N = \int_O^\infty |f/f_o|^{3/2} |E(f)|^2 P(f) \, df \quad (2)$$

and the quantities written with square brackets are expressed in dB, i.e. $[A] = 10 \log_{10}|A|$.

For a specified cable and number of systems, all of the terms in the inequality above are known except $[I_N]$ and $[N_o]$, which depend on the internal characteristics of the regenerator, and differ from manufacturer to manufacturer. The arrangement of the invention provides a circuit in which the expression $[I_N]-[N_o]$, termed here the NEXT noise figure, can be measured directly without having access to the interior of the regenerator.

According to this aspect of the invention there is provided an instrument for testing susceptibility of PCM regenerators to near end crosstalk noise said instrument comprising:

(a) an artificial line having a voltage transfer function $G(f)$, corresponding to the voltage transfer function of a pair of wires in a multipair cable, (b) means for applying a test signal having a power spectral density $P(f)$ corresponding to that produced at the output of a PCM regenerator to the artificial line, (c) means for generating a noise signal having the same spectral density $P(f)$ as the test signal, (d) a filter having a voltage transfer function, the magnitude of which is:

$$(1/R_3)|f/f_o|^{\tfrac{3}{4}}$$

where $R_3$ is a constant and $2f_o$ is the clock rate of the PCM system, said means for generating being connected to the filter, (e) an attenuator coupled to the output of the filter, and (f) an adding circuit having one input coupled to the output of the artificial line and another input coupled to the output of said attenuator whereby in use a regenerator to be tested is connected to the output of the adding circuit, the attenuator being adjusted to vary the effective noise due to near end crosstalk applied to the regenerator under test.

In its most convenient form, the instrument would include an internal test signal generator for generating the test signal having the power spectral density $P(f)$. Additionally, the instrument would include an error detector to count the errors produced in the regenerator under test.

FEXT NOISE FIGURE

Consider two cable or screened cable operation with FEXT dominant. If the inequality which is set out below is satisfied then 99% of systems will have less than a specified error rate (typically $1 \times 10^{-7}$):

$$\mu_{OF} > [N] + 0.115\sigma_{OF}^2 + [T] + [I_F] - [N_o] \quad (3)$$
$$- \tfrac{1}{2}[1 + \tfrac{1}{N}(U \cdot 10^{0.023\sigma_{OF}^2} - 1)]$$
$$+ 4.86[1 + \tfrac{1}{N}(U \cdot 10^{0.023\sigma_{OF}^2} - 1)]^{\tfrac{1}{2}}$$

where the subscript F refers to FEXT parameters, $$I_F = \int_0^\infty (f/f_0)^2 |G(f)|^2 |E(f)|^2 P(f) \cdot df \quad (4)$$

and G(f), E(f), P(f), T and U are as hereinbefore defined.

In the inequality above for a known number of systems (N+1) and a specified cable, all of the terms are known except [$I_F$] and [$N_o$] and the second aspect of the invention is concerned with a technique whereby the expression [$I_F$]-[$N_o$], termed here the FEXT noise figure, can be measured directly without having access to the interior of the regenerator under test.

In accordance with this aspect of the invention there is provided an instrument for testing the susceptibility of PCM regenerators to far end crosstalk noise said instrument comprising:

(a) an artificial line having a voltage transfer function G(f), corresponding to the voltage transfer function of a pair of wires in a multipair cable, (b) means for applying a test signal having a power spectral density P(f) corresponding to that produced at the output of a PCM regenerator to the artificial line via an adding circuit, (c) means for generating a noise signal having the same spectral density P(f) as the test signal, (d) a filter having a voltage transfer function, the magnitude of which is $$1/R_3 |f/f_0|$$

where $R_3$ is a constant and $2f_o$ is the clock rate of the PCM system, the means for generating being connected to the filter, (e) an attenuator coupled to the output of the filter, and wherein (f) the adding circuit has one input coupled to the output of the means for applying a test signal and another input coupled to the output of said attenuator, the output of the adding circuit being connected to the artificial line, the output of the artificial line being connected to the input of a regenerator under test, the attenuator being adjusted to vary the effective noise due to far end crosstalk applied to the regenerator under test.

In the most convenient form of the instrument the means for applying a test signal would include a generator and the means for generating a noise signal would include a wide band noise source. Further, an error detecting and counting circuit would normally be provided to detect and count the errors produced in the regenerator under test.

Figure 2:
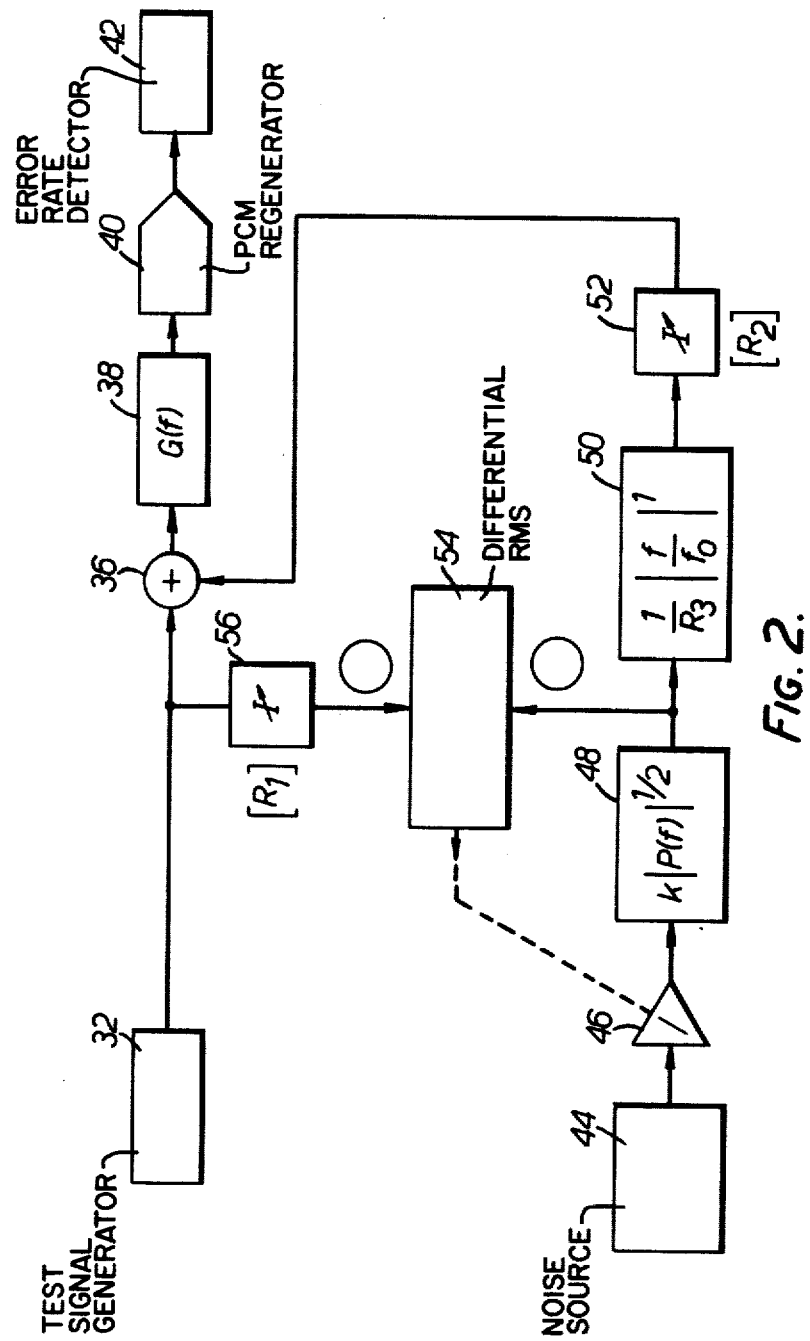
Figure 3A:
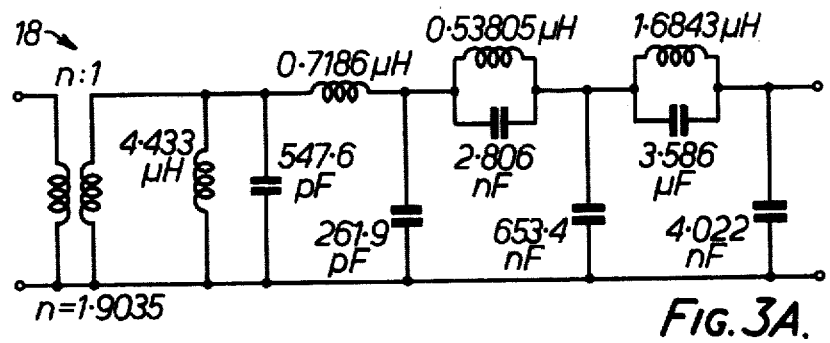
Figure 3B:
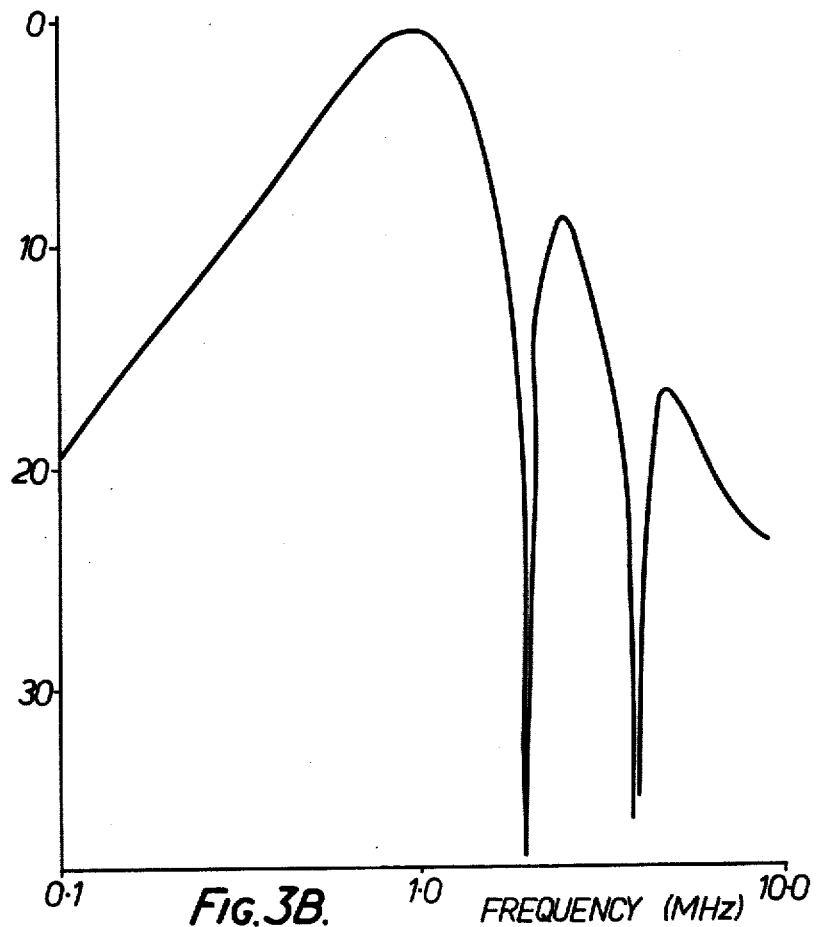
Figure 4A:
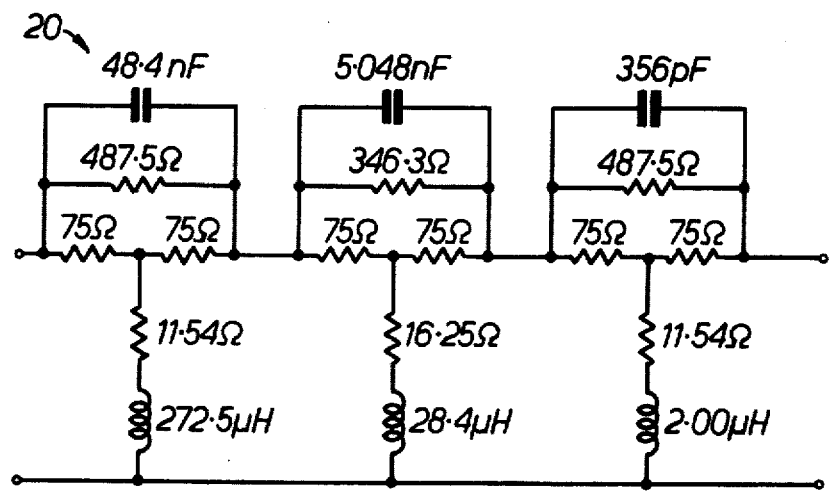
Figure 4B:
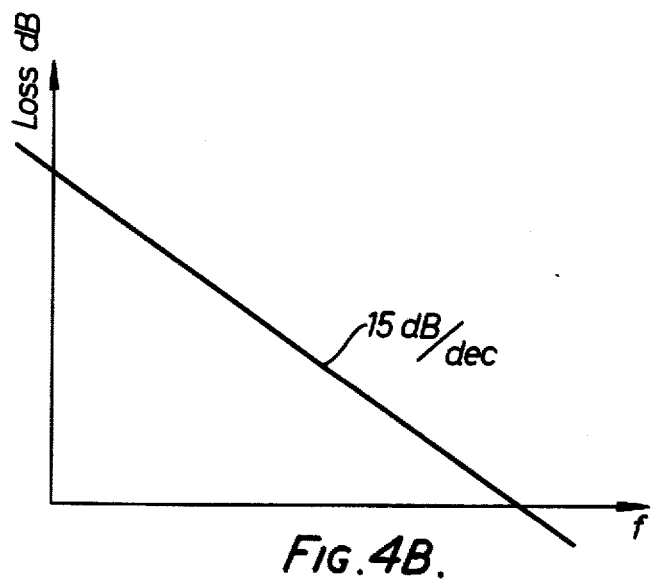
Figure 5A:
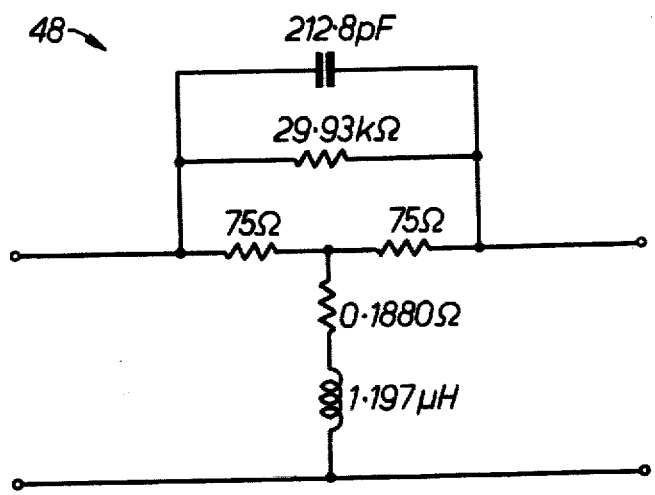
Figure 5B:
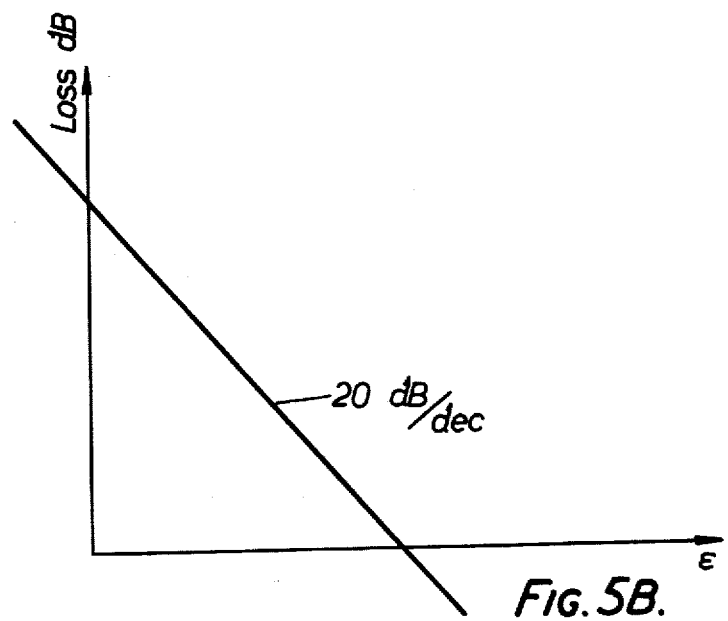

The invention will now be further described with reference to the accompanying drawings, in which:

FIG. 1 is a circuit illustrating the principles of the invention as applied to measuring NEXT noise figure, FIG. 2 is a circuit illustrating the principles of the invention as applied to the measurement of FEXT noise figure, FIG. 3A is a circuit of a typical network for simulating the function P(f), when driven by a wide band noise source, FIG. 3B shows the frequency response of the network of FIG. 3A, FIG. 4A illustrates a typical circuit for the NEXT simulating network, FIG. 4B shows the frequency response of the network shown in FIG. 4A, FIG. 5A illustrates a typical network for simulating FEXT, and FIG. 5B illustrates the frequency response of the network shown in FIG. 5A.

The circuit illustrated in FIG. 1 provides a means for measuring directly the NEXT noise figure [$R_N$] which is defined as follows:

$$[R_N] = [I_N] - [N_o] \quad (5)$$

The circuit comprises a test signal generator 2 the output of which is connected to an artificial line 6 the output of which is connected to an adding circuit 8 the output of which in turn is connected to the input of a PCM regenerator 10 which is to be tested. The output of the regenerator 10 is connected to an error rate detector circuit 12. The circuit further includes a wide band noise source 14 connected to a variable gain amplifier 16, the output of which is connected to a power spectral density simulating network 18 which in turn is connected to a mean NEXT simulating filter 20. The output of the filter 20 is connected to an attenuator 22 the output of which is connected to the adding circuit 8. The circuit further includes a differential RMS circuit 24 having one input coupled to the output of the test signal generator 2 via an optional attenuator 26. The differential RMS circuit has a second input which is connected between the network 18 and the filter 20. The output of the differential RMS circuit is coupled to the variable gain amplifier 16 and operates on the latter so as to equalize the RMS powers at its two inputs.

All of the circuit elements in the circuit above except for the simulating network 18 and NEXT filter 20 are of known configuration. See for instance "Description and Operating Manual 692/1B of a PCM Regenerator Tester PRT-1" published by Wandel and Goltermann, Reutlingen Germany.

Assuming that the test signal generator 2 produces a signal having a power spectral density P(f) the power spectral density sensed by the differential RMS circuit 24 will be P(f)/R$_1$ where [R$_1$] is the loss of the attenuator 26. The differential RMS circuit 24 will then control the variable gain amplifier 16 so as to produce a signal at the output of the simulating network 18 having the same power spectral density P(f)/R$_1$. The mean NEXT simulating filter 20 has a voltage transfer function magnitude:

$$\frac{1}{R_3} |f/f_0|^{\frac{1}{4}}$$

so that the power spectral density at its output will be equal to:

$$\frac{P(f)}{R_1} \left( \frac{1}{R_3} |f/f_0|^{\frac{1}{4}} \right)^2$$

and the power spectral density at the output of the attenuator 22 will be:

$$\frac{P(f)}{R_1} \left( \frac{1}{R_3} |f/f_0|^{\frac{1}{4}} \right)^2 \frac{1}{R_2}$$

where [R$_2$] is the loss of attenuator 22.

The regenerator under test has a first stage which comprises an equalizer having a voltage transfer function E(f) before the decision making circuitry which assigns a +1, 0 or −1 to incoming signals on the basis of their amplitude level. Thus, the noise level at the decision making point is:

$$\frac{P(f)}{R_1 R_2} \left(\frac{1}{R_3} |f/f_o|^{\frac{3}{2}}\right)^2 |E(f)|^2$$

$$= \frac{1}{R_1 R_2 R_3{}^2} |f/f_o|^{3/2} |E(f)|^2 P(f)$$

thus the mean square noise at the decision point is:

$$N_o = \frac{1}{R_1 R_2 R_3{}^2} \int_0^\infty |f/f_o|^{3/2} |E(f)|^2 P(f) \cdot df$$

$$= \frac{I_N}{R_1 R_2 R_3{}^2} \text{ from equation 2 above}$$

By taking the logarithm of each side of the equation we obtain:

$10 \log_{10} N_o = 10 \log_{10} I_N - 10 \log_{10} R_1 - 10 \log_{10} R_2 - 10 \log_{10} R_3{}^2$ ∴ $[N_o] = [I_N] - [R_1] - [R_2] - [R_3{}^2]$ thus,
$[R_N] = [I_N] - [N_o]$
$= [R_1] + [R_2] + [R_3{}^2]$ Thus, the sums of the losses in the attenuators 22 and 26 and the NEXT simulating filter 20 at frequency fo, equal the NEXT noise figure $[R_N]$ as required. In use the values of the attenuators 22 and 26 are adjusted until the regenerator under test has the required error rate.

FIG. 3A illustrates the power spectral density simulating network 18 suitable for simulation of a 30 channel PCM system. The frequency response of the filter is illustrated in FIG. 3B. The required frequency performance of the network 18 is well known and the actual realisation of it as illustrated in FIG. 3A does not form an essential part of the invention and accordingly the network need not be described in detail.

The mean NEXT simulating filter 20 has a voltage transfer function:

$$\frac{1}{R_3} |f/f_o|^{\frac{3}{2}}$$

which has a 15 dB/decade characteristic as illustrated in FIG. 4B and one realisation is illustrated in FIG. 4A. The technique of realizing the filter illustrated in FIG. 4A and the mode of operation of that circuit need not be described in detail in the present specification.

FIG. 2 illustrates a circuit for measurement of the FEXT noise figure. The circuit includes a test signal generator 32 the output of which is connected to an adding circuit 36 the output of which is in turn connected to the input of an artificial line 38 having a voltage transfer function G(f). Output from the artificial line 38 is connected to a PCM regenerator 40 which is to be tested. The output of the regenerator 40 is connected to an error rate detector 42. The circuit also includes a wide band noise source 44 connected to a variable gain amplifier 46 which in turn is connected to a power spectral density simulating network 48 having a voltage transfer function $K|P(f)|^{\frac{1}{2}}$, the output of the network 48 being connected to the input of a mean FEXT simulating filter 50. The output from the filter 50 is connected via an attenuator 52 to the other input of the adding circuit 36. The circuit further includes a differential RMS circuit 54 one input of which is connected to the output of the test signal regenerator 32 via an attenuator 56. The other input of the differential RMS circuit 54 is connected to the output of the simulating network 48. Output from the differential RMS circuit is connected to the variable gain amplifier 46 and operates to equalize the RMS powers at its inputs.

By analyzing the circuit of FIG. 2 in a similar manner to that discussed above in relation to FIG. 1, it can be shown that:

$$N_o = \frac{1}{R_1 R_2 R_3{}^2} \int_0^\infty |f/f_o|^2 |G(f)|^2 |E(f)|^2 P(f) df$$

$$= \frac{I_F}{R_1 R_2 R_3{}^2}$$

$[R_F] = [R_1] + [R_2] + [R_3{}^2]$ where $[R_3{}^2]$ is the loss at $f_o$ of the mean FEXT simulating network 50. In use of the circuit the values of the attenuators 52 and 56 are adjusted until the regenerator 40 under test produces the required error rate and the values of the losses in the attenuators and in the FEXT simulating network 50 at frequency fo can be summed as above to obtain the required FEXT noise figure $[R_F]$.

Many modifications will be apparent to those skilled in the art. For instance the circuit of FIG. 1 operates in the same manner if the positions of attenuator 22 and the filter 20 are interchanged. Further the position of the variable gain amplifier 16 could be interchanged with that of simulating network 18. Similarly in FIG. 2, the circuit operates in the same manner if the positions of attenuator 52 and the filter 50 are interchanged and likewise the positions of the variable gain amplifier 46 could be interchanged with the simulating network 48.

I claim:

1. An instrument for testing susceptibility of PCM regenerators to near end crosstalk noise said instrument comprising:
    (a) an artificial line having a voltage transfer function G(f), corresponding to the voltage transfer function of a pair of wires in a multipair cable,
    (b) an adding circuit having one input coupled to the output of said artificial line, and an output connectable to a PCM regenerator to be tested,
    (c) means for applying a test signal having a power spectral density P(f) corresponding to that produced at the output of a PCM regenerator to said artificial line,
    (d) means for generating a noise signal having the same spectral density P(f) as said test signal,
    (e) a signal path between the output of said means for generating a noise signal and another input of said adding circuit said path including in series (i) a filter having a voltage transfer function, the magnitude of which is:

$1/R_3 |f/f_o|^{\frac{3}{2}}$ where $R_3$ is a constant and $2f_o$ is the clock rate of the PCM system, and (ii) an attenuator adjusted to vary the effective noise due to near end crosstalk applied to the regenerator under test.

2. An instrument as claimed in claim 1 including an error rate detecting circuit and means to couple said error rate detecting circuit to the output of a PCM regenerator under test.

3. An instrument as claimed in claim 1 wherein said means for applying a test signal comprises a test signal generator connected to the input of said artificial line.

4. An instrument as claimed in claim 3, including an error rate detecting circuit and means to couple said error rate detecting circuit to the output of a PCM regenerator under test.

5. An instrument as claimed in claim 3 wherein said means for generating a noise signal includes a power spectral density simulating network and a noise source coupled to the input of said power spectral density simulating network which has a voltage transfer function $k|P(f)|^{\frac{1}{2}}$, where k is a constant and control means for controlling the amplitude of the power spectral density at the output of the simulating network so as to equal that at the output of the test signal generator.

6. An instrument as claimed in claim 5 wherein the control means includes a variable gain amplifier and a differential RMS circuit having one input coupled to the output of said test signal generator and another input coupled to the output of the simulating network, said differential RMS circuit producing a control signal which is coupled to control said variable gain amplifier which is connected to said stimulating network.

7. An instrument as claimed in claim 5, including an error rate detecting circuit and means to couple said error rate detecting circuit to the output of a PCM regenerator under test.

8. An instrument as claimed in claim 5 wherein the control means includes a variable gain amplifier and a differential RMS circuit having one input coupled to the output of said test signal generator and another input coupled to the output of the simulating network, said differential RMS circuit producing a control signal which is coupled to control said variable gain amplifier which is connected to the output of said noise source.

9. An instrument as claimed in claim 8, including an error rate detecting circuit and means to couple said error rate detecting circuit to the output of a PCM regenerator under test.

10. An instrument for testing the susceptibility of PCM regenerators to far end crosstalk noise said instrument comprising:
    (a) an artificial line having a voltage transfer function G(f), corresponding to the voltage transfer function of a pair of wires in a multipair cable, said artificial line connectable to the input of a PCM regenerator to be tested,
    (b) an adding circuit having its output connected to the input of said artificial line,
    (c) means for applying a test signal having a power spectral density P(f) corresponding to that produced at the output of a PCM regenerator to one input of said adding circuit,
    (d) means for generating a noise signal having the same spectral density P(f) as the test signal,
    (e) a signal path between the output of said means for generating a noise signal and another input to said adding circuit, said path including in series (i) a filter having a voltage transfer function, the magnitude of which is $$1/R_3|f/f_o|$$

wherein $R_3$ is a constant and $2f_o$ is the clock rate of the PCM system and (ii) an attenuator adjusted to vary the effective noise due to far end crosstalk applied to the regenerator under test.

11. An instrument as claimed in claim 10 including an error rate detecting circuit and means to couple said error rate detecting circuit to the output of the PCM regenerator under test.

12. An instrument as claimed in claim 10 wherein said means for applying a test signal comprises a test signal generator connected to one input of said adding circuit.

13. An instrument as claimed in claim 12 including an error rate detecting circuit and means to couple said error rate detecting circuit to the output of the PCM regenerator under test.

14. An instrument as claimed in claim 12 wherein said means for generating a noise signal includes a power spectral density simulating network and a noise source coupled to the input of said power spectral density simulating network which has a voltage transfer function $k|P(f)|^{\frac{1}{2}}$, where k is a constant and control means for controlling the amplitude of the power spectral density at the output of the simulating network so as to equal that at the output of the test signal generator.

15. An instrument as claimed in claim 14 including an error rate detecting circuit and means to couple said error rate detecting circuit to the output of the PCM regenerator under test.

16. An instrument as claimed in claim 14 wherein the control means includes a variable gain amplifier and a differential RMS circuit having one input coupled to the output of said test signal generator and another input coupled to the output of the simulating network, said differential RMS circuit producing a control signal which is coupled to control said variable gain amplifier which is connectable to the output of said simulating network.

17. An instrument as claimed in claim 14 wherein the control means includes a variable gain amplifier and a differential RMS circuit having one input coupled to the output of said test signal generator and another input coupled to the output of the simulating network, said differential RMS circuit producing a control signal which is coupled to control said variable gain amplifier which is connected to the output of said noise source.

18. An instrument as claimed in claim 17 including an error rate detecting circuit and means to couple said error rate detecting circuit to the output of the PCM regenerator under test.

* * * * *